Patented Nov. 2, 1948

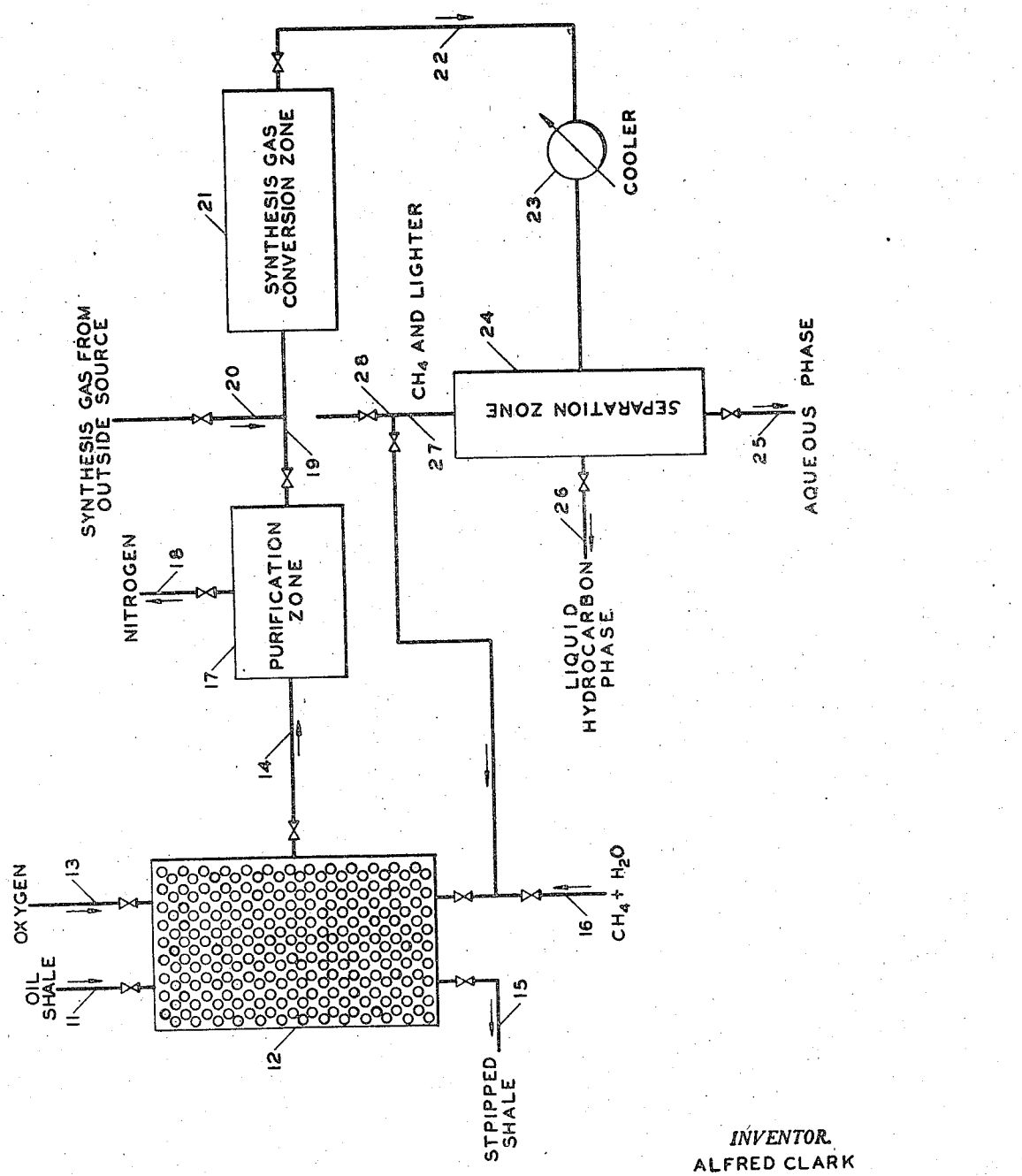

2,452,634

UNITED STATES PATENT OFFICE 2,452,634

FISCHER-TROPSCH SYNTHESIS GAS FROM OIL SHALE

Alfred Clark, Bartlesville, Okla., assignor to Phillips Petroleum Company, a corporation of Delaware Application August 25, 1947, Serial No. 770,534

10 Claims. (Cl. 260—449.6)

This invention relates to a process for the production of hydrogen and carbon monoxide. In one embodiment it relates to the production of a mixture of hydrogen and carbon monoxide utilizing oil shale as one of the reactants. In another embodiment this invention relates to a process for the production of hydrogen and carbon monoxide for use as synthesis gas in the Fischer-Tropsch and related syntheses.

Mixtures of carbon monoxide and hydrogen are useful in synthesizing many organic compounds and a suitable mixture of these components is known to the art as "synthesis gas." Synthesis gas may be produced by the following well known reactions:

(1) $3CH_4 + CO_2 + 2H_2O \rightarrow 4CO + 8H_2$ (2) $CH_4 + CO_2 \rightarrow 2CO + 2H_2$ (3) $CH_4 + H_2O \rightarrow CO + 3H_2$ I have discovered a method of producing synthesis gas by partial combustion of oil shale and in utilizing the resulting hot spent shale as a heat exchange medium to bring the temperature of a mixture of hydrocarbon gas, carbon dioxide and/or steam up to a point where synthesis gas is produced.

For convenience I will refer to the hydrocarbon gas as methane, but it is to be understood that any suitable normally gaseous hydrocarbon material, such as methane, ethane, propane, ethylene or propylene, or various mixtures thereof, may be used.

One object of my invention is to provide a process of producing synthesis gas from oil shale.

Another object is to provide a process for converting oil shale and gaseous hydrocarbons into a mixture containing carbon monoxide and hydrogen.

Another object is to utilize the heat absorbed by the spent shale during partial combustion of carbonaceous material contained in the fresh shale to convert methane, carbon dioxide and/or steam to synthesis gas.

Another object of this invention is to manufacture synthesis gas from oil shale and gaseous hydrocarbon in one reaction chamber, utilizing little, if any, extraneous heat.

Still another object is to provide an improved and efficient process for recovering carbonaceous material from oil shale.

Other objects of my invention will be obvious to one skilled in the art from the accompanying disclosure and discussion.

I have discovered a process whereby synthesis gas can be produced using as reactants methane, carbon dioxide, steam and oil shale. According to the process of my invention, oil shale and oxygen or a gas containing free oxygen, such as air, are charged to the top of a reaction chamber operated at elevated temperature. At the bottom of the reactor, stripped shale is removed, and a gas mixture consisting of methane, carbon dioxide, and/or steam is introduced. From an intermediate point in the reactor, gas containing hydrogen and carbon monoxide in proportion suitable for use in the Fischer-Tropsch type synthesis is withdrawn. In the upper section of the chamber, the exothermic reaction between organic matter liberated from the shale and oxygen heats the shale and produces carbon monoxide and hydrogen; and in the lower section heat for the endothermic reaction of methane with steam and/or carbon dioxide to form hydrogen and carbon monoxide is furnished by the heat carried by the shale from the upper exothermic reaction zone into the lower endothermic reaction zone.

One embodiment of this invention is shown diagrammatically by the accompanying drawing.

Referring to the drawing, oil shale, from a source not shown, is introduced continuously through line 11 at the top of a reaction chamber 12. Stripped shale is removed continuously from the bottom of the reaction chamber through line 15. Along with the oil shale, oxygen or oxygen-containing gas, such as air, is also introduced at the top of the reaction chamber through line 13. An exothermic reaction proceeds in the upper portion of chamber 12 at high temperature, possibly as high as 2500° F., giving a mixture comprising hydrogen and carbon monoxide, in which the molar quantity of carbon monoxide exceeds that of hydrogen. The rate of oxygen and oil shale delivery to the reactor is adjusted so that at some intermediate point in the reactor the carbonaceous matter is substantially completely burned off the shale and the oxygen concentration reduced to a negligible percentage. The amount of oxygen necessary in any particular case will depend on the amount of carbonaceous material in the shale and the chemical character of the carbonaceous material. These matters will have to be determined by experiment for each particular shale. The stripped shale now at high temperature moves continuously down through chamber 12 beyond this point and supplies the heat required for the endothermic reaction between methane and steam, introduced through line 16, which produces a mixture of hydrogen and carbon monoxide rich in hydrogen.

Methane and steam are introduced at the bottom of the reactor, as previously described, and proceed upwardly at such a rate that a substantial proportion of the methane is reacted by the time it reaches the above-mentioned intermediate point in the reactor. The effluent gas, consisting chiefly of hydrogen and carbon monoxide, plus any inert gas charged, and any impurities produced, such as sulfur and nitrogen compounds, is withdrawn from reaction chamber 12 at this intermediate point through line 14 and passes to purification zone 17 where it is scrubbed with a suitable liquid, such as, triethanolamine or the like to remove sulfur bodies and carbon dioxide and the like that may be present. Any inert material, such as nitrogen that may be in the system, may be removed through line 18. The scrubbed material, comprising chiefly carbon monoxide and hydrogen, from purification zone 17 passes through line 19 to synthesis gas conversion zone 21. Synthesis gas from an outside source may be introduced into line 19 through line 20, if desired, and the total mixture passes to conversion zone 21. In conversion zone 21 the carbon monoxide and hydrogen are converted to hydrocarbons, alcohols, aldehydes, ketones, water and the like by the well known Fischer-Tropsch type reactions. The effluent from reaction zone 21 passes through line 22 and cooler 23 to separation zone 24. In separation zone 24 the cooled products are allowed to separate by gravity into an aqueous phase, a liquid hydrocarbon phase, and a gaseous phase, which comprises usually methane and lighter; however, in some cases butanes, propane and lighter may be present in this gaseous phase. The aqueous phase is removed from zone 24 through line 25 for further treatment as desired. The liquid hydrocarbon phase is withdrawn from zone 24 through line 26 for further treatment as desired. The gaseous phase which comprises methane and lighter is removed from zone 24 through line 27 and recycled to reaction chamber 12 through line 16. If desired, however, all or a portion of this gaseous phase may be removed from the system through line 28.

In the above mentioned drawing reference to certain equipment such as pumps, gauges, and the like which obviously would be necessary to actually operate the process has been intentionally omitted. Only sufficient equipment has been shown to illustrate the process and it is intended that no undue limitation be read into this invention by reference to the drawing and discussion thereof.

The reaction chamber may be operated at atmospheric pressure; however, a pressure as high as 500 p. s. i. or higher may be employed.

The temperature in the zone of combustion of oil shale by oxygen may reach as high as 2500° F. The upper temperature limit for this zone is about the sintering temperature of the particular shale being used, as temperatures above this may lead to operational difficulties. I prefer to employ a temperature in this zone of my process in the range of about 1500 and 2000° F. In the zone of endothermic reaction below the point of withdrawal of effluent gases, the reaction temperature may vary from a minimum of 1500° F. at the bottom of the endothermic reaction zone to about 2500° F. at the point of withdrawal of effluent gases, however, a temperature in the range of about 1600 to 2000° F. is usually desirable. If desired, this chamber may be elongated in the lower section to provide a preheat section for the entering methane and $H_2O$ to raise the entering gas to reaction temperature and cool the shale before discharge, thus providing more efficient heat utilization.

The particle size of the oil shale may vary considerably, depending upon economic conditions surrounding the grinding or pulverizing process. It is desirable in most cases that the particle size be less than about 2 mesh and the preferred size is in the order of 8–16 mesh.

The gases introduced at the bottom of the reactor may comprise (1) methane, steam and carbon dioxide in a ratio of about 3 mols methane, 2 mols steam and 1 mol carbon dioxide, (2) methane and carbon dioxide in a mol ratio of about 1:1, (3) methane and steam in a mol ratio of about 1:1, depending upon the gases available and the ratio of hydrogen to carbon monoxide desired in the effluent gas. Oxygen may also be introduced along with these gases at the bottom of the reaction chamber. Carbon dioxide and/or steam may be introduced along with oxygen and oil shale to prevent excessive temperatures in the upper part of the chamber. In general, however, the overall reaction in the upper part of the chamber, that is, above the point of withdrawal of exit gases will be exothermic and that in the lower part, endothermic. Effluent gas from the Fischer-Tropsch synthesis step, consisting essentially of carbon dioxide, methanol, ethane and hydrogen may also be employed as feed to the bottom of the reactor. These materials may be obtained for the process from any desirable source.

The relative position of the effluent gas line from the reactor depends on several factors such as the relative rates of the reactions involved, the composition of the reactants and the amount of sensible heat available in the stripped shale for the endothermic reaction taking place in the lower part of the reactor. In general, the effluent line will be situated below the mid-point of the reactor. The diameter of the reactor below the effluent line may be reduced in order to maintain a higher linear velocity of flow of the heat-carrying stripped shale in the region of endothermic reaction. The relative diameters of the two zones of reaction may also be adjusted so that the same pressure drop is maintained from the top of the reactor to the effluent line as from the bottom of the reactor to the effluent line, thus bringing about conditions for least diffusion at the boundary of the two reaction zones.

Operation by means of this invention has two chief advantages:

(1) With suitable heat exchange between discharged shale, effluent gases and reactants, the reaction is practically self-sufficient, and very little extraneous heat need be supplied. However, in some cases, such as when the oil shale contains small amounts of carbonaceous material, additional heat may be added by burners, etc., or coal or coke and the like may be admixed with the oil shale to furnish additional heat and at the same time produce gases leading to synthesis gas.

(2) In comparison with methods of obtaining usable products from oil shale by retorting, the present method allows of such greater recovery of carbonaceous material for conversion into motor fuel. In retorting the fixed carbon and carbon produced in retorting remain unavailable for processing into motor fuel.

It is to be understood that this invention should not be unnecessarily limited to the above discussion and description and that modifications and variations may be made without departing from the invention of from the scope of the claims.

I claim:

1. A process for the production of synthesis gas which comprises introducing simultaneously particles of oil shale of a size not exceeding about 2 mesh and an oxygen-containing gas into the upper portion of a reaction zone; maintaining a temperature in said upper portion of said reaction zone in the range of about 1500 to 3000° F.; maintaining a pressure in said reaction zone in the range of about atmospheric and about 500 pounds per square inch; maintaining the ratio of oil shale to oxygen in said oxygen-containing gas such that the carbonaceous material in the oil shale will be substantially completely converted to carbon monoxide and hydrogen, passing the resulting hot spent shale to the lower portion of said reaction zone; maintaining the temperature in said lower portion of said reaction zone in the range between about 1600 and 2000° F.; introducing a mixture comprising methane and water into the lower portion of said reaction zone, causing said mixture to pass upwardly through said lower portion of said reaction zone and countercurrently to said hot spent shale whereby said methane-water mixture is converted to synthesis gas, withdrawing from an intermediate portion of said reaction zone synthesis gas resulting from the reactions in both the upper and lower portions of said reaction zone, and removing the spent shale from the reaction zone.

2. A process for the production of synthesis gas which comprises introducing simultaneously particles of oil shale of a size not exceeding about 2 mesh and an oxygen-containing gas into the upper portion of a reaction zone; maintaining a temperature in said upper portion of said reaction zone in the range of about 1500 to 2500° F.; maintaining a pressure in said reaction zone in the range of about atmospheric to about 500 pounds per square inch; maintaining the ratio of oil shale to oxygen in said oxygen-containing gas such that the carbonaceous material in the oil shale will be substantially completely converted to carbon monoxide and hydrogen, passing the resulting hot spent shale to the lower portion of said reaction zone; maintaining the temperature in said lower portion of said reaction zone in the range between about 1500 and 2500° F.; introducing a mixture comprising methane and water into the lower portion of said reaction zone, causing said mixture to pass upwardly through said lower portion of said reaction zone and countercurrently to said hot spent shale, whereby said methane-water mixture is converted to synthesis gas, withdrawing from an intermediate portion of said reaction zone synthesis gas resulting from the reactions in both the upper and lower portions of said reaction zone, and removing the spent shale from the reaction zone.

3. A process for the production of synthesis gas which comprises introducing simultaneously oil shale and an oxygen-containing gas into the upper portion of a reaction zone; maintaining a temperature in said upper portion of said reaction zone in the range of about 1500 to 2500° F.; maintaining the ratio of oil shale to oxygen in said oxygen-containing gas such that the carbonaceous material in the oil shale will be substantially completely converted to carbon monoxide and hydrogen, passing the resulting hot spent shale to the lower portion of said reaction zone; maintaining the temperature in said lower portion of said reaction zone in the range between about 1500 and 2500° F.; introducing a mixture of methane and water into the lower portion of said reaction zone, causing said mixture to pass upwardly through said lower portion of said reaction zone and countercurrently to said hot spent shale, whereby said methane-water mixture is converted to synthesis gas, withdrawing from an intermediate section of said reaction zone synthesis gas resulting from the reaction in both the upper and lower portions of said reaction zone, and removing the spent shale from the reaction zone.

4. A process for the production of a mixture of carbon monoxide and hydrogen which comprises introducing simultaneously oil shale and an oxygen-containing gas into the upper portion of a reaction zone; maintaining a sufficient temperature in said upper portion of said reaction zone to substantially convert the carbonaceous material in said oil shale to a mixture of carbon monoxide and hydrogen; passing the resulting hot spent shale to the lower portion of said reaction zone; introducing into said lower portion of said reaction zone a mixture selected from the group consisting of methane and water; methane and carbon dioxide; and methane, carbon dioxide and water, causing said mixture to pass upwardly and countercurrently to said hot spent shale, whereby said mixture is converted into a mixture of carbon monoxide and hydrogen, and withdrawing from an intermediate portion of said reaction zone a mixture comprising carbon monoxide and hydrogen resulting from the reactions in both the upper and lower portions of said reaction zone.

5. A process for the production of a mixture of carbon monoxide and hydrogen which comprises introducing simultaneously oil shale and an oxygen-containing gas into the upper portion of a reaction zone; maintaining a sufficient temperature in said upper portion of said reaction zone to substantially convert the carbonaceous material in said oil shale to a mixture of carbon monoxide and hydrogen; passing the resulting hot spent shale to the lower portion of said reaction zone; introducing a mixture of methane and water into said lower portion of said reaction zone; causing said mixture to pass upwardly and countercurrently to said hot spent shale, whereby said methane-water mixture is converted into a mixture of carbon monoxide and hydrogen, and withdrawing from an intermediate portion of said reaction zone a mixture comprising carbon monoxide and hydrogen resulting from the reactions in both the upper and lower portions of said reaction zone.

6. A process for the production of synthesis gas which comprises introducing simultaneously particles of oil shale of a size not exceeding about 2 mesh and an oxygen-containing gas into the upper portion of a reaction zone; maintaining a temperature in said upper portion of said reaction zone in the range of about 1500 to 2500° F.; maintaining a pressure in said reaction zone in the range of about atmospheric to about 500 pounds per square inch; maintaining the ratio of oil shale to oxygen in said oxygen-containing gas such that the carbonaceous material in the oil shale will be substantially completely converted to carbon monoxide and hydrogen, passing the resulting hot spent shale to the lower portion of said reaction zone; maintaining the temperature in said lower portion of said reaction zone in the range between about 1500 and 2500° F.; introducing a mixture comprising methane and water into the lower portion of said reaction zone, causing said mixture to pass upwardly through said lower portion of said reaction zone and countercurrently to said hot spent shale, whereby said methane-water mixture is converted to synthesis gas, withdrawing from an intermediate portion of said reaction zone synthesis gas resulting from the reactions in both the upper and lower portions of said reaction zone and removing the spent shale from the reaction zone; passing said synthesis gas to a conversion zone maintained at conversion temperature and pressure whereby the synthesis gas is converted into higher boiling materials; cooling the effluent from said conversion zone and passing the cool products to a separation zone; allowing the products to separate into an aqueous phase, a liquid hydrocarbon phase and a gaseous phase; recycling at least a portion of said gaseous phase to the lower portion of said reaction zone and removing the remaining products from the system.

7. A process for the production of a mixture of carbon monoxide and hydrogen which comprises introducing simultaneously oil shale and an oxygen-containing gas into the upper portion of a reaction zone; maintaining a sufficient temperature in said upper portion of said reaction zone to substantially convert the carbonaceous material in said oil shale to a mixture of carbon monoxide and hydrogen; passing the resulting hot spent shale to the lower portion of said reaction zone; introducing into said lower portion of said reaction zone a mixture selected from the group consisting of methane and water; methane and carbon dioxide; and methane, carbon dioxide and water, causing said mixture to pass upwardly and countercurrently to said hot spent shale, whereby said mixture is converted into a mixture of carbon monoxide and hydrogen and withdrawing from an intermediate portion of said reaction zone a mixture comprising carbon monoxide and hydrogen resulting from the reactions in both the upper and lower portions of said reaction zone; passing said synthesis gas to a conversion zone maintained at conversion conditions whereby the synthesis gas is converted into higher boiling materials; cooling the effluent from said conversion zone and passing the cool products to a separation zone, allowing the products to separate into a liquid phase, and a gaseous phase, recycling at least a portion of said gaseous phase to the lower portion of the reaction zone and removing the liquid phase from the system.

8. A process for the production of synthesis gas which comprises introducing simultaneously oil shale and an oxygen-containing gas into the upper portion of a reaction zone; maintaining a temperature in said upper portion of said reaction zone in the range of about 1500 to 2500° F.; maintaining the ratio of oil shale to oxygen in said oxygen-containing gas such that the carbonaceous material in the oil shale will be substantially completely converted to carbon monoxide and hydrogen, passing the resulting hot spent shale to the lower portion of said reaction zone; maintaining the temperature in said lower portion of said reaction zone in the range between about 1500 and 2500° F.; introducing a mixture of a normally gaseous hydrocarbon having not more than three carbon atoms per molecule and water into the lower portion of said reaction zone, causing said mixture to pass upwardly through said lower portion of said reaction zone and countercurrently to said hot spent shale, whereby said normally gaseous hydrocarbon-water mixture is converted to synthesis gas, withdrawing from an intermediate section of said reaction zone synthesis gas resulting from the reaction in both the upper and lower portions of said reaction zone, and removing the spent shale from the reaction zone.

9. A process for the production of a mixture of carbon monoxide and hydrogen which comprises introducing simultaneously oil shale and an oxygen-containing gas into the upper portion of a reaction zone; maintaining a sufficient temperature in said upper portion of said reaction zone to substantially convert the carbonaceous material in said oil shale to a mixture of carbon monoxide and hydrogen; passing the resulting hot spent shale to the lower portion of said reaction zone; introducing into said lower portion of said reaction zone a mixture comprising a normally gaseous hydrocarbon containing not more than three carbon atoms per molecule and water; causing said mixture to pass upwardly and countercurrently to said hot spent shale, whereby said mixture is converted into a mixture of carbon monoxide and hydrogen, and withdrawing from an intermediate portion of said reaction zone a mixture comprising carbon monoxide and hydrogen resulting from the reactions in both the upper and lower portions of said reaction zone.

10. A process for the production of a mixture of carbon monoxide and hydrogen which comprises introducing simultaneously oil shale and an oxygen-containing gas into the upper portion of a reaction zone; maintaining a sufficient temperature in said upper portion of said reaction zone to substantially convert the carbonaceous material in said oil shale to a mixture of carbon monoxide and hydrogen; passing the resulting hot spent shale to the lower portion of said reaction zone; introducing into said lower portion of said reaction zone a mixture comprising a normally gaseous hydrocarbon containing not more than three carbon atoms per molecule and water; causing said mixture to pass upwardly and countercurrently to said hot spent shale, whereby said mixture is converted into a mixture of carbon monoxide and hydrogen and withdrawing from an intermediate portion of said reaction zone a mixture comprising carbon monoxide and hydrogen resulting from the reactions in both the upper and lower portions of said reaction zone; passing said synthesis gas to a conversion zone maintained at conversion conditions whereby the synthesis gas is converted into higher boiling materials; cooling the effluent from said conversion zone and passing the cool products to a separation zone, allowing the products to separate into a liquid phase, and a gaseous phase, recycling at least a portion of said gaseous phase to the lower portion of the reaction zone and removing the liquid phase from the system.

ALFRED CLARK.

No references cited.